INVENTOR
JOHN DAVID SCHUSTER

Feb. 16, 1971   J. D. SCHUSTER   3,563,104
PHASE CONTROLLER

Filed Dec. 20, 1968

INVENTOR
JOHN DAVID SCHUSTER

BY Plumley, Tyner & Sandt

ATTORNEYS

Feb. 16, 1971  J. D. SCHUSTER  3,563,104
PHASE CONTROLLER

Filed Dec. 20, 1968  3 Sheets-Sheet 3

INVENTOR
JOHN DAVID SCHUSTER

BY *Plumley, Tyner & Sandt*
ATTORNEYS

United States Patent Office 3,563,104
Patented Feb. 16, 1971

3,563,104
PHASE CONTROLLER
John David Schuster, Sylvania, Ohio, assignor to Dynamics Research & Development Corporation, Toledo, Ohio, a corporation of Ohio
Filed Dec. 20, 1968, Ser. No. 785,564
Int. Cl. F16h 35/06
U.S. Cl. 74—395                                          5 Claims

ABSTRACT OF THE DISCLOSURE

The phase of the output shaft of a mechanical power transmission relative to its input shaft is selectively controlled through a first gear mechanism which is rotatably mounted about the axes of the shafts and a second gear mechanism fixedly supported with respect to the axes of the shafts and intermeshing with the first gear mechanism.

---

The present invention relates generally to phasing transmissions adapted to be interposed between power transmission elements such as a driving means and a driven means. More particularly, the invention relates to phasing transmissions having a drive and a set of gears arranged for the adjustment of phase between an input shaft and an output shaft. Even more specifically, the invention relates to the noted phase transmission device wherein a gear cage is rotatably mounted about the input and the output shaft to control phasing between the shafts.

The gearing of the phase controller of this invention is similar to that used in differentials since both devices use a fixed gear on a rotating shaft which transmits power through a pinion (gear) to a second rotating shaft. However, the phase controller of this invention is distinguished from differentials since differentials by definition change the speed of rotation of one shaft relative to the other but the phase controller does not alter the relative speeds; only the relative phases of the shafts. Thus, while the gearing is similar in the phase controller and a differential and while each will differentiate between aligned shafts, it must be remembered that one changes speed and the other changes phase. For purposes of distinction, the inventive concept using differential-type gears is referred to as an epicyclic bevel gear train.

"Phase" is defined for purposes of this specification as the position of an imaginary point on the circumference of a rotating shaft. When considering relative phases of aligned rotating shafts, each shaft will be viewed at a given point in time and the distances of the imaginary points will be measured from a reference point. For example, looking at the cross-section of a driving shaft as compared to that of a driven shaft, circular sections are viewed. By superimposing a clock face on each cross-section, the position of a point on the circumference of a shaft is located by the hour hand of the clock. Using 12 o'clock as the reference point then, the relative phases of the shafts are compared by noting the distance the imaginary points have travelled during a given time period or a given number of revolutions. It will be apparent that if the shafts are to be driven at the same speed, each will be in phase with the other unless one is temporarily slowed down. Once this is done, the "phase" will change even though the speeds are allowed to become equal again. For example, if the output shaft is temporarily slowed while the input shaft rotates at the initial speed, then the point on the input can travel one-half revolution (to 6 o'clock) with the point on the output travelling one-quarter revolution (to 3 o'clock). The angular deviation between the points is 90°, so once the shafts return to the same speed they are rotating 90° out of phase. This invention thus enables the adjustment of phase between two shafts rotating at the same speed.

Although differentials have been used to transmit power, they have suffered from many disadvantages which do not adapt them for synchronizing machine elements. Some of those disadvantages will be at once apparent from a consideration of previously used devices, particularly those used in automobiles. An automobile differential is typical of all differentials. It is a unit which equalizes the traction on both wheels and permits one wheel to turn faster than the other as is needed on curves. Each axle is driven by a bevel gear meshing with pinions on spindles secured to the differential case. The case also carries ring gear attached to the differential set. An undesirable feature of the conventional differential is that no more traction may be developed on one wheel than on the other. Thus, if one wheel slips on ice, there is no traction to move the car. Various attempts have been made to correct this feature, e.g. one device introduced a design which applied the major driving force to the wheel with the better traction, and several other devices offered similar non-slip differentials. The differential is not limited to use in automobiles; however, that is the most familiar application of the device. Differentials may be used in any application which requires varying speed between a driven shaft and a driving shaft. While differentials inherently change phase they are constantly changing it since the speeds of rotation are not the same. It is often desirable to change phase a predetermined amount and allow aligned shafts to rotate at the same speed. Examples of the use of such an apparatus include the synchronization of moving conveyor belts wherein one conveyor supplies another conveyor and must present carried items at precisely the right time. In this example, it is conventional to use a single driving element and thus the two conveyors may be driven by separate shafts from that driving element. In order to synchronize the two driven shafts, the epicyclic bevel gear train of the present invention may be utilized to vary phase but not speed. Other uses include application to printing presses, paper converters, textile machinery, web cut-off machinery, packaging machinery, etc.

Among the serious disadvantages inherent in previously used power transmissions are the lack of ability to withstand continuous service, the lack of a compact device, and the complex mechanics needed for designing and assembling as well as repairing the devices. Also, the amount of speed or phase adjustment previously possible was limited. The inflexibility of the control means and the inflexibility of the adjusting means thus limit the amount of adjustment to a predetermined maximum which is set by the design of the device itself. An additional major disadvantage of previously used devices is the lack of the means for adjusting the synchronization of the two driven shafts while in motion. Costly down time results when adjustments must be made by stopping mechanism to adjust the speeds or phases of the shafts. The present invention provides a novel phase controlling power transmission which eliminates the above-noted deficiencies in previously used devices and which provides a cage mounted for rotation about a driven and a driving shaft. The invention provides a power transmission of the epicyclic bevel gear train type that can be adjusted to control the phase of the driven shaft and the driving shaft while in motion. Exact timing and exact registration for sequencing can be achieved through use of the device of this invention. The small and compact nature of the inventive device adapt it for use in many applications. The compactness is achieved in part by mounting the inboard bearings within a worm gear, thus using said gear as a housing.

In use, the unit can transmit power from an input shaft to an output shaft at varying ratios, e.g. 1:1, wherein no speed change will occur. The input may be to either shaft and the drive torque is transmitted from the input to the output through suitable gears. The gears are arranged as an epicyclic bevel gear train with first gears keyed to the input and output shafts and idler gears which run freely on bearings and pins. Due to this gear arrangement, the direction of rotation may be reversed from input to output and either shaft can be used to provide the input. Additionally, the idler gears are held within a cage or spider which has worm gear teeth cut into its outer circumference which are engaged with a worm. The worm may be rotated by a suitable adjustment means such as a hand knob mounted on or adjacent to the housing, a motorized knob, an air driven unit, etc. to vary the position of the worm gear and thus vary the position of the idler gears carried by the worm gear. Phase control between the input and output shafts is accomplished by rotation of the worm. This causes the cage to rotate within the gear housing, moving the idler gears a like amount. Since no obstacles to rotation are present, the cage rotates 360° or multiples thereof to give an infinite range of adjustability in phase relationship of the shafts. So long as the axis through the idler gears is in a constant location, the input and output shafts will maintain a constant phase relationship, rotating at the same speed but in opposite directions. Movement of the axis through the idler gears about the axis of rotation of the shafts will cause a change in the relative position (phase) of the input to output shafts equal to twice the angular movement of the idler gears, viz. movement of idler gear axis through 15° will change the phase angle between the input and output shafts by 30° since the directions of rotation are opposite.

This unit is necessary where many machines are driven from a common source and each machine must be synchronized with the others. By placing the unit of this invention in the drive to each machine, it is possible to adjust the phase of each machine relative to the other equipment on the common drive and thereby achieve point to point registration between machines.

With the above-noted disadvantages of prior power transmissions in mind, it is a primary object of the present invention to provide a power transmission mechanism which is capable of controlling phase between driven shafts in a reliable and efficient manner.

Another object of the invention is to provide an improved phasing transmission for varying phase between an output shaft relative to its input shaft while allowing equal speeds of rotation.

Another object is to provide an improved phasing transmission having a positive drive, which drive can be provided by either shaft and which will produce an oppositely driven shaft rotating at the same speed but with variable phase relation.

Another object is to provide a phase controller which is simple and neat yet rugged, and adapted for continuous service.

Another object is to provide a phase controlling device that can be pilot-mounted to a machine frame or foot-mounted for in-line installation.

Another object is to provide a phase controller which has 360° mounting capability.

Another object is to provide an improved phase controller device which is infinitely adjustable and which provides a positive lock, once adjusted.

Another object is to provide a phase controller device which permits synchronization of machinery or machine components while in motion, thus eliminating down time.

These and other objects and advantages of the present invention will be apparent from a consideration of the brief description given above and a consideration of the preferred embodiments set forth hereinbelow by way of drawings and specific description.

Figure 1:
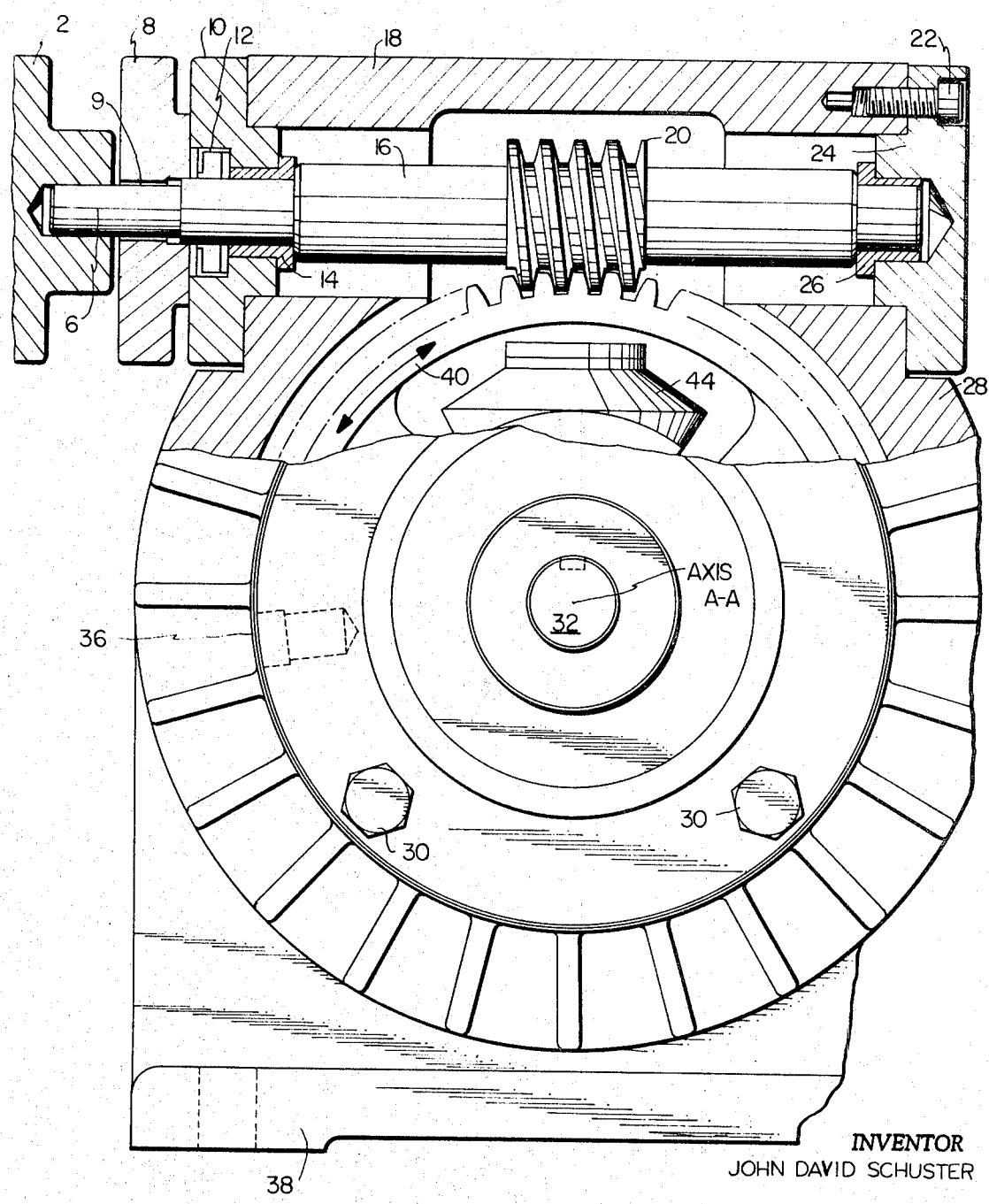
FIG. 1 represents a front elevation view in section showing the improved epicyclic bevel gear train of the present invention.
Figure 2:
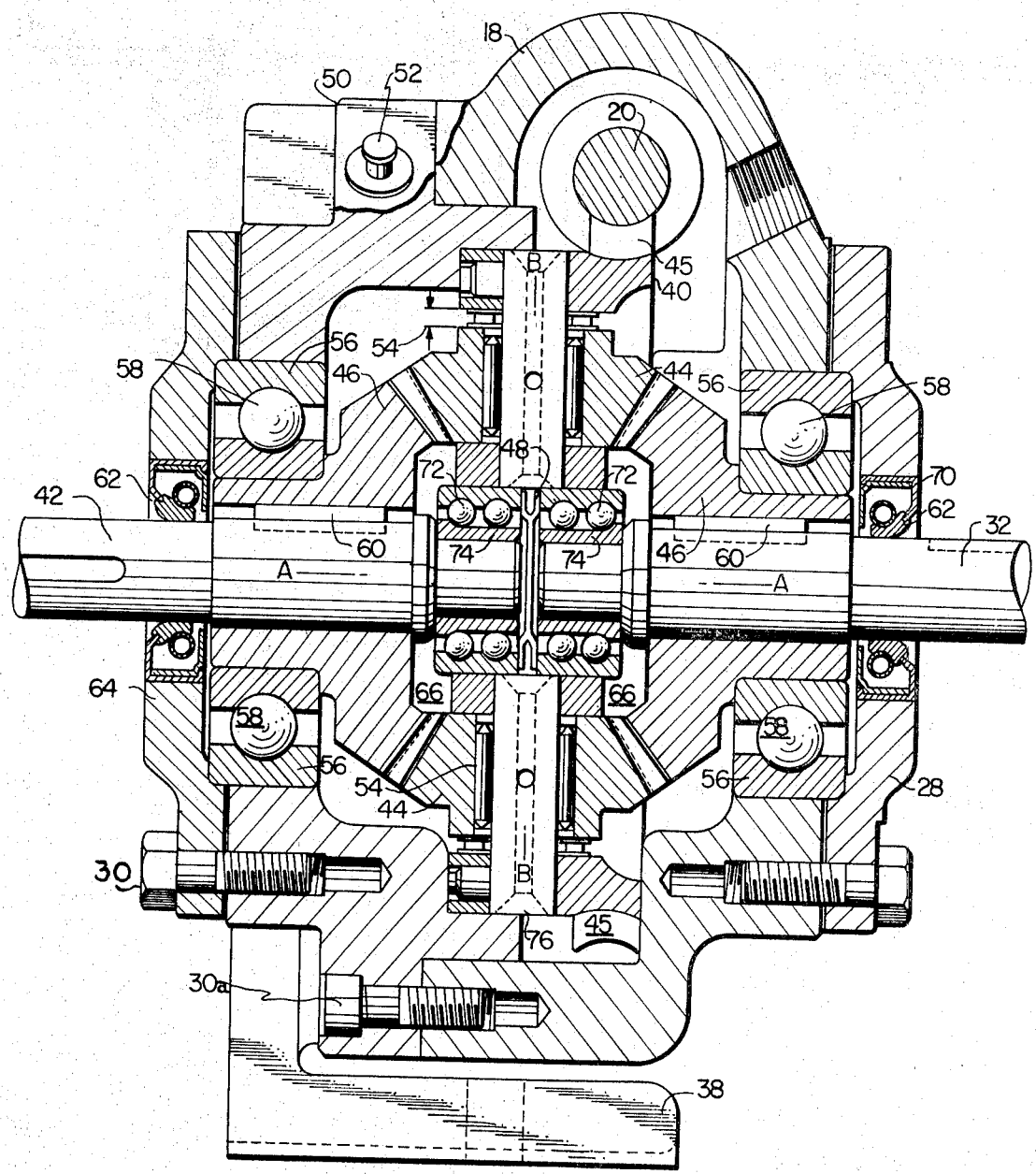
FIG. 2 represents a side elevation view in section illustrating the gearing arrangement of the phase controller of the present invention.

Referring to the drawings, and specifically to FIG. 1, the cross-sectional view of the gearing mechanism illustrates the components as follows. Reference numeral 2 designates a manually-adjustable control knob for rotating worm 20. Worm 20 is attached to control knob 2 by means of lockscrew 6. The adjustment of the worm with respect to the housing is maintained by locking hub 8, which is internally threaded for engagement with threaded area 9 corresponding to the smaller diameter portion of worm 20. The worm 20 is carried in a housing 18 having end cap 24 attached by bolt 22 and having its opposite end sealed by a worm bearing end cap 10. Worm bearing end cap 10 further houses an oil seal 12 for the worm bearing mechanism. A flange bearing 14 and an opposite flange bearing 26 serve to mount worm 20 in the housing. The worm gear 40 intermeshes with worm 20 as seen, and as further seen in the following figures. The worm gear 40 carries idler gears 44 and this assembly is housed in a cylindrical case metal housing such as cast aluminum, cast iron or other metals, which forms a male and female portion, as best seen in FIG. 2. The male and female portions of the housing are secured by bolts 30a and a cast metal mounting bracket 38 of materials like the housing is provided for the casing. An oil level check 36 is provided and generally corresponds with the oil level within the gearing. Shaft 32 comprises either the input or output shaft.

Referring now to FIG. 2, a side view of the bearing of FIG. 1 is seen. In this view, shaft 32 rotates in a counter-clockwise direction, while aligned shaft 42 rotates in a clockwise direction. The two shafts are aligned in the housing and each carries a bevel gear 46 attached by keys 60. The bevel gears 46 are supported by main bearings 56 which comprise conventional single race ball bearings, the balls being shown as 58. The bearing is of such diameter as to permit easy assembly or disassembly of either of the two bevel gear assemblies by removal of end caps 64 and 28 held by bolts 30. Thus the shafts rotate within the housing on bearings 56. An oil seal 62 is provided at the entrance of each shaft into the housing. The oil seals are supported in the housing walls by means of integral oil seal housing 70. Any conventional oil sea such as a rubber flap aligned with an O-ring may be utilized. An inner bearing 66 comprising a double race 74 and balls 72 supports the inner end of the shafts 32 and 42. A loading spring 48 is aligned with the races of bearing 66 in order to provide accurate alignment of the shaft ends. Thus, as one shaft is driven as an input shaft (either shaft can be the input), torque is transmitted from input to output through bevel gear 46 to idler gear 44. These gears are arranged as an epicyclic bevel gear train and the torque is again transmited to the opposite bevel gear 46 for output. While bevel gears are locked by keys 60 to the driven and driving shafts, the idler gears 44 run freely on pins 76 and needle bearing 54. Due to this arrangement, direction of rotation is reversed from input to output as shown by the arrow. The idler gears 44 are held within a cage or spider 40 which also serves as the worm gear 40 of FIG. 1 which has worm teeth 45 on its outer periphery. The worm teeth 45 engage worm 20 which can be rotated by hand knob 2 shown in FIG. 1, or by any other conventional rotating means, e.g. an electric motor, an air powered lever, or a flexible cable attached to a remote hand knob may be used. Thus, rotation of worm 20 engages worm gear 40 and rotates the worm gear which carries the idler gears 44. Thus, by viewing the axis B—B of the idler gears it can be seen that this axis can be rotated about the main shaft axis A—A.

Phase-change between input and output shafts is accomplished by rotation of worm 20, thus momentarily altering the speed of shafts 32 and 42 by superimposing rotation of gears 44 on the driving force.

Rotation of worm 20 engages the worm gear teeth 45, causing spider or worm gear 40 to rotate within the housing, i.e. to rotate out of or into the paper as shown in FIG. 2, or to rotate either clockwise or counterclockwise as shown in FIG. 1. As long as the axis B—B through the idler gears 44 is in a constant fixed location, the input and output shafts 32 and 42 will maintain a constant relationship of phase while rotating. Rotation will be at the same speed but in opposite directions, but will remain in phase since an imaginary point will travel an equal distance in a given time. Movement of the axis B—B about axis A—A will cause a change in the relative position of input to output shaft equal to twice the angular movement of the idler gears. For example, movement of idler gear axis B—B through 15° will result in a phase angle change between input shaft 32 and output shaft 42 of 30°. This is obvious since the shafts rotate in the opposite direction, and the rotation of one will double the overall effect. By altering the speed of rotation of the driven shaft momentarily the phase is changed by a degree which depends on the amount of rotation of worm 20.

As seen, the operation of the phase controller of this invention allows the input and output shafts to rotate at the same speed, but in different phases, and by operating the worm and worm gear mechanism it is possible to momentarily change the absolute speed of one shaft, which inherently changes the relative phases of the shafts. The speeds are altered only during the period that the worm gear mechanism is in operation. As soon as the adjustment of the worm gear mechanism has been made, the two shafts again operate at the same speed. This worm gear mechanism, therefore, permits a relative angular adjustment between the two shafts (i.e. a change of phase), in contrast with previously used devices, which permits the input and output shafts to rotate at different speeds by employing such devices as planetary gear systems, worm gear adjusting mechanisms, and braking mechanisms.

While it should be obvious to those skilled in the art that the particular materials of construction and dimensions which should be used will vary with the adaption intended for the phase controller, the following is given by way of non-limiting examples as a suitable working model. The idler gear 44 which also serves as a bevel pinion may be a 20-tooth gear having an outer diameter of approximately 2⅓" and adapted to fit a 1" outer diameter supporting pin. The teeth should be arranged at an angle of approximately 36° and should extend a length of approximately 9/16". These gears can be arranged on needle bearings 54 of conventional construction adapted to fit the bevel gears. Ring ball bearings 56, 58 may, for example, have an approximately 1¼" bore with a 3⅛" outer diameter being approximately ¾" wide and having a single row of radial balls. The inner ball bearings 66 may have, for example, a ½" bore, a 1¼" outer diameter, and be approximately ½" wide. These bearings should have a double row of light balls. Loading spring 48 should be a finger-type spring having a 1¼" outer diameter and an approximately ¾" inner diameter, being ⅛" thick and being adapted to deflect to 1/16" upon application of 11 to 15 pounds pressure. The main shafts 32 and 42 are, of course, of varying dimensions, but a suitable dimension includes approximately 15/16" at its outer diameter and approximately ½" at its smallest diameter. Worm gear 40 may comprise a single thread worm having right-hand screws adapted to mate with the worm 20 which is approximately 1⅛" at its largest dimension and approximately ½" at its smallest dimension. The bevel gear 46 may comprise a 30-tooth gear having teeth arranged at an angle of approximately 50° to the horizontal and extending a length of approximately 9/16". The inner bore of the bearings should be approximately ¾" diameter while the overall, maximum outer dimension should be approximately 3⅛". Bearings 46 may be keyed to the shafts 32 and 42 by means of keys 60 which may comprise steel bars approximately ½" in length. The housing components 18, 50, 54 and 28 may comprise cast aluminum components approximately 7" in height and approximately 6" in length. Such a unit could be adapted to develop 3 H.P. at 1800 r.p.m. The housing may be mounted by means of conventional footing. The housing comprises bracket 38 to any conventional footing. The housing comprises a main housing female portion 18 shown in FIG. 2 and a main housing male portion 50 also shown in FIG. 2. End caps 64 and 28 are bolted to the male, female composite. Additionally, an air vent 52 is provided since the gearing is adapted to be filled, preferably to half its height, with a suitable lubricating oil. While the structural housing components may be of cast aluminum, the gears should preferably be of steel which are heat treated. Additionally, bronze materials may be used for the worm gear and for suitable flanges and locking devices. Stainless steel could, of course, be used but is more expensive and is generally not required.

Figure 3:
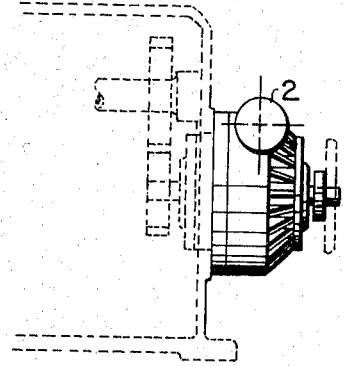
FIG. 3 represents the novel phase controller face-mounted on a machine.
Figure 4:
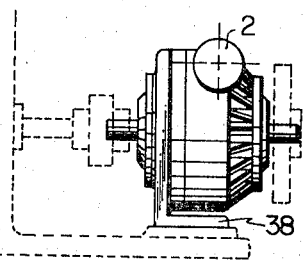
FIG. 4 represents the phase controller base-mounted for in-line assembly.
Figure 5:
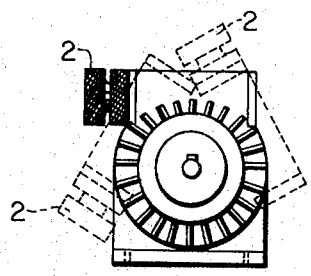
FIG. 5 represents various surface mounting positions of the phase controller.

FIGS. 3 through 5 illustrate applications of the phase controller of the present invention. In FIG. 3 the invention is face-mounted on a machine so that the shaft of the machine may be controlled in its phase relationship to an input shaft by means of knob 2. FIG. 4 illustrates that the casing and its mounting bracket 38 may be mounted for in-line assembly as the input to a driven machine. FIG. 5 shows various positions of the adjusting mechanism by means of knob 2.

While the above descriptive materials of construction and dimensions are adapted for use in a preferred working model, it is clear that the particular use intended for the machine will dictate such specifications and such specifications should not in any manner limit the inventive concept. What is intended to be protected is described in the appended claims.

I claim:

1. A mechanical power transmission comprising a pair of axially aligned rotatable shaft members adapted to be an input shaft and an output shaft interposed for power transmission between an external driving means and an external driven means, a first pair of gears fixedly mounted with one gear on each shaft and a second rotatable pair of gears intermeshing in driving relationship with said first gear pair, said second pair of gears being freely rotatable and being mounted in and carried by a worm gear cage having external gear teeth on its outer periphery intermeshing with a worm, said worm gear cage adapted to be rotated about the axis of said shafts and providing a housing for inboard bearings for said shafts, thereby providing means for adjusting the phase of rotation between said input and output shafts.

2. The device of claim 1 wherein locking means is provided to fix the worm in a given position, thereby fixing the axes of the rotatable gears with respect to the axes of the fixed gears.

3. The device of claim 1 wherein the worm gear is adapted for 360° rotation, thereby providing infinite adjustability of phase relationship between said shafts.

4. The device of claim 1 wherein locking means is provided to fix the worm in a given position, thereby fixing the axes of the rotatable gears with respect to the axes of the fixed gears.

5. The device of claim 1 wherein the worm gear is adapted for 360° rotation, thereby providing infinite adjustability of phase relationship between said shafts.

References Cited

UNITED STATES PATENTS

| | | | |
|---|---|---|---|
| 1,295,800 | 2/1919 | Schneider | 74—395 |
| 1,920,988 | 8/1933 | King | 74—395 |
| 2,540,154 | 2/1951 | Schneider | 74—665 |
| 3,318,341 | 5/1967 | Nollet | 74—395X |
| 3,364,789 | 1/1968 | Whitfield | 74—675 |
| 3,385,125 | 5/1968 | Plumb | 74—395 |

LEONARD H. GERIN, Primary Examiner